May 22, 1923.  1,456,019
H. A. WENTWORTH
PROCESS FOR EXTRACTING OIL
Filed Oct. 4, 1920
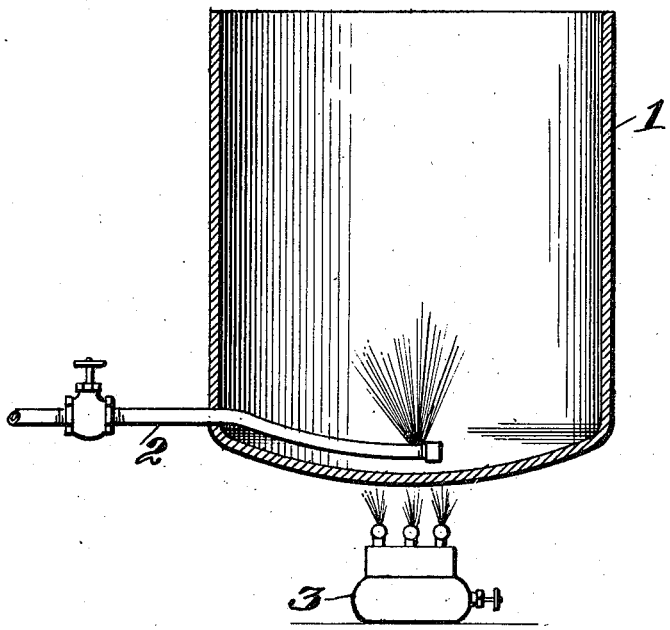
Inventor
H. A. Wentworth
By E. E. Trooman & Co.,
his Attorneys.

Patented May 22, 1923.

1,456,019

UNITED STATES PATENT OFFICE.

HARTLEY A. WENTWORTH, OF DEER ISLAND, NEW BRUNSWICK, CANADA.

PROCESS FOR EXTRACTING OIL.

Application filed October 4, 1920. Serial No. 414,525.

*To all whom it may concern:*

Be it known that I, HARTLEY A. WENTWORTH, a subject of the King of England, residing at Deer Island, in the county of Charlotte, Province of New Brunswick, Canada, have invented certain new and useful Improvements in Processes for Extracting Oil, of which the following is a specification, reference being had therein to the accompanying drawings.

This invention relates to a process for extracting oil from fish, animal or vegetable waste of any kind containing oil and of improving the color thereof.

My process may be used in connection with vegetable oils, as well as animal oils. For instance, waste oil from the tables of a sardine factory, where the packing of sardines is being carried on, which waste is filled, to some extent, with waste fish and dirt of various descriptions and puts that waste oil, composed of cottonseed or olive oil in conjunction with natural oil in the herring through the process hereinafter described in connection with the extraction of oil from fish or animal matter, with a like result of separating the oil from the foreign matter therein, so that my process applies to both the extraction of oil from animal and vegetable matter.

In the accompanying drawing the figure represents a receptacle 1, in which the animal or vegetable matter is treated, 2 being the valved steam pipe for ejecting steam into the receptacle 1 for heating the mass contained in the receptacle. Or I may use any kind of a burner or lamp or stove 3, instead of the steam pipe 2, to heat the mass or compound being treated in the receptacle 1.

As an illustration of the manner of carrying out my process, I may take a barrel containing twenty-five gallons of cod blubber, so called, being the livers of fish from which the oil has been extracted by all the means known to the ordinary fisherman. Usually the livers are thrown into a barrel and left in the sun and the oil tries out of them and is skimmed off. When no more oil is to be had by this process, the residue called blubber is thrown away and it is this refuse or waste blubber which is treated. The twenty-five gallons of liquid waste is treated to an injection of live steam, into the receptacle 1, the mass or waste having been first placed in the receptacle, until the whole mass is at the boiling point, when the steam is shut off. Then ten pounds of seventy-six percent caustic soda is dissolved in three gallons of water; when thoroughly dissolved, I then turn it into the heated cod blubber, stirring it thoroughly so that it is mixed all through the blubber. Then I add to the mixture one gallon of sixty or sixty-six degrees commercial sulphuric acid, pouring the acid in very slowly while continually stirring the mixture. The mixture is then allowed to stand, and then the oil is dipped from the receptacle 1.

It is a fact that where less than a half pint of oil was visible in the mixture before the mass was treated by my process, yet after my process is carried out, several gallons may be dipped off, even before the heated mixture has had time to fully settle.

Either steam or a burner may be used for it is necessary to bring the mass or compound to a boiling point, but I prefer to use steam, as the best method for quick and thorough results.

Great caution should be used in treating the mixture with the acid, that is, the acid should not be turned in in large quantities, or in one place, to cause excessive heat, and the mixture should be stirred thoroughly while the acid is being put in.

What I claim is:

A process for extracting oil comprising putting twenty-five gallons of fish matter into a receptacle, then injecting live steam into the fish matter and heating said fish matter to the boiling point, and then shutting off the steam, then thoroughly stirring a mixture of ten pounds of seventy-six per cent caustic soda in three gallons of water in the steam treated fish matter, then adding to the mixture one gallon of sixty degrees of commercial sulphuric acid by pouring the acid in very slowly while continually stirring the mixture, and then allowing the mixture to stand undisturbed for a period, the oil then being removed, all substantially as described.

In testimony whereof I hereunto affix my signature.

HARTLEY A. WENTWORTH.